US009388909B2

(12) United States Patent
Corallo

(10) Patent No.: US 9,388,909 B2
(45) Date of Patent: Jul. 12, 2016

(54) DUAL CHECK VALVE AND METHOD OF CONTROLLING FLOW THROUGH THE SAME

(71) Applicant: Hamilton Sundstrand Space Systems International, Inc., Windsor Locks, CT (US)

(72) Inventor: Roger Corallo, West Suffield, CT (US)

(73) Assignee: HAMILTON SUNDSTRAND SPACE SYSTEMS INTERNATIONAL, INC., Windsor Locks, CT (US)

(*) Notice: Subject to any disclaimer, the term of this patent is extended or adjusted under 35 U.S.C. 154(b) by 197 days.

(21) Appl. No.: 14/244,991

(22) Filed: Apr. 4, 2014

(65) Prior Publication Data

US 2015/0285386 A1    Oct. 8, 2015

(51) Int. Cl.
*F16K 15/04* (2006.01)
*F04B 53/10* (2006.01)
*F16K 11/044* (2006.01)
*F16K 11/056* (2006.01)

(52) U.S. Cl.
CPC .............. *F16K 15/04* (2013.01); *F04B 53/10* (2013.01); *F16K 11/044* (2013.01); *F16K 11/056* (2013.01); *Y10T 137/7846* (2015.04)

(58) Field of Classification Search
CPC ...... F16K 15/04; F16K 11/02; F16K 27/0245
USPC ................. 137/512, 516, 625.4, 602
See application file for complete search history.

(56) References Cited

U.S. PATENT DOCUMENTS

| 315,521 | A | * | 4/1885 | Lord | ............ | F17C 13/045 |
| | | | | | | 137/113 |
| 1,894,603 | A | * | 1/1933 | Towne | .............. | F16K 15/04 |
| | | | | | | 137/493 |
| 1,938,369 | A | * | 12/1933 | Beebe | .............. | F04B 23/06 |
| | | | | | | 137/113 |
| 2,354,791 | A | * | 8/1944 | Boldt | .............. | F16K 11/044 |
| | | | | | | 137/112 |
| 2,501,755 | A | * | 3/1950 | Bent | .............. | B60T 13/581 |
| | | | | | | 137/113 |
| 2,627,388 | A | * | 2/1953 | Johnson | .......... | F16K 11/056 |
| | | | | | | 137/112 |
| 4,086,936 | A | * | 5/1978 | Vork | .............. | F16K 15/042 |
| | | | | | | 137/516.29 |

(Continued)

FOREIGN PATENT DOCUMENTS

WO    03004914 A1    1/2003
WO    2010080161 A1    7/2010

OTHER PUBLICATIONS

Netherlands Search Report and Written Opinion, Netherlands Application No. NL 2014231, Date of Mailing Jan. 14, 2016, Netherlands Intellectual Property Office; Netherlands Search Report and Written Opinion 8 pages.

*Primary Examiner* — Craig Schneider
*Assistant Examiner* — Daniel P Donegan
(74) *Attorney, Agent, or Firm* — Cantor Colburn LLP

(57) ABSTRACT

A dual check valve includes, a housing having a cavity fluidically connecting three ports, a movable member movably engaged within the cavity from at least a first position occluding a first port of the three ports, a second position occluding a second port of the three ports, and a third position allowing flow between both the first port, the second port and a third port of the three ports.

11 Claims, 2 Drawing Sheets

(56) References Cited

U.S. PATENT DOCUMENTS

| | | | | |
|---|---|---|---|---|
| 4,162,146 A * | 7/1979 | Seibert | B01D 53/04 | 96/113 |
| 4,744,121 A * | 5/1988 | Swessel | B65G 69/2823 | 14/71.7 |
| 4,944,327 A * | 7/1990 | Gyben | F16K 15/04 | 137/519.5 |
| 5,816,313 A * | 10/1998 | Baker | F16K 15/048 | 137/519.5 |
| 6,260,575 B1 * | 7/2001 | Brown | B05B 15/10 | 137/513.7 |
| 2003/0044288 A1 * | 3/2003 | Utsumi | F02M 55/00 | 417/199.1 |
| 2005/0121084 A1 * | 6/2005 | Andersson | F16K 15/048 | 137/533.11 |
| 2008/0023004 A1 * | 1/2008 | Wu | A62B 9/02 | 128/204.21 |
| 2009/0032116 A1 * | 2/2009 | Bock | F16H 61/0276 | 137/513 |
| 2010/0032036 A1 * | 2/2010 | Quendt | F16K 11/044 | 137/625.4 |
| 2015/0285386 A1 * | 10/2015 | Corallo | F16K 15/04 | 137/513 |

* cited by examiner

DUAL CHECK VALVE AND METHOD OF CONTROLLING FLOW THROUGH THE SAME

This invention was made with Government support under contract number NNK12MS01S awarded by NASA. The Government has certain rights in the invention.

BACKGROUND OF THE INVENTION

Under certain conditions it can be deleterious for devices, such as pumps, for example, to be sitting idle (i.e. not actively pumping or rotating). One such condition may occur when the idle device experiences high vibration, such as aboard a rocket during launch. High vibration can cause damage to bearings and their opposing surfaces due to the bearings repeatedly making and breaking contact in the same place on such surfaces. In systems employing redundant pumps, for example, one or more of the pumps can sit idle since only one of the pumps needs to operate at any given moment.

BRIEF DESCRIPTION OF THE INVENTION

Disclosed herein is a dual check valve. The dual check valve includes, a housing having a cavity fluidically connecting three ports, a movable member movably engaged within the cavity from at least a first position occluding a first port of the three ports, a second position occluding a second port of the three ports, and a third position allowing flow between both the first port, the second port and a third port of the three ports.

Further disclosed herein is a method of controlling flow through a dual check valve. The method includes flowing fluid through a first port into a cavity in a housing, flowing fluid through a second port into the cavity in the housing, positioning a movable member within the cavity proximate a third port with the flowing fluid, and flowing fluid from both the first port and the second port out the third port.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
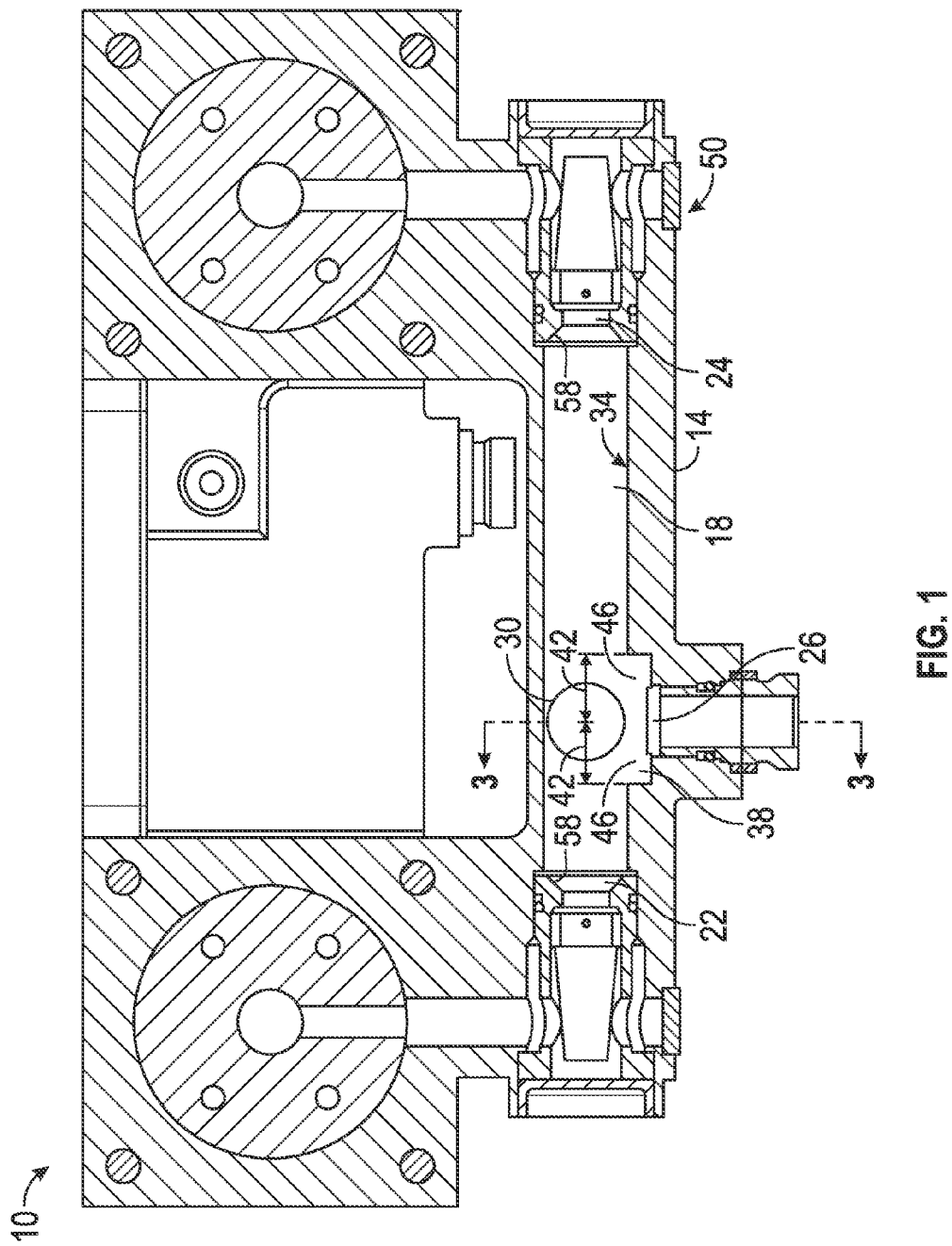
FIG. 1 depicts a cross sectional view of a dual check valve disclosed herein taken at arrows 1-1 in FIG. 2.

Referring to FIG. 1, an embodiment of a dual check valve is illustrated at 10. The illustrated dual check valve 10 includes a housing 14. The housing 14 includes a cavity 18 formed within it that fluidically connects three ports 22, 24, 26. The first port 22 and the second port 24 of the three ports are inlet ports, such that fluid may flow from outside the housing 14 and into the cavity 18. The third port 26 is an outlet port such that fluid flows out of the cavity 18 through the third port 26. A movable member 30 illustrated in this embodiment as a hollow sphere is movable within the cavity 18. As illustrated, the cavity 18 is a cylinder. Of course, the shapes of the member 30 and cavity 18 could be varied.

The movable member 30 is movable at least between a first position wherein it occludes flow between the cavity 18 and the first port 22, a second position wherein it occludes flow between the cavity 18 and the second port 24, and a third position (as shown in FIG. 1) wherein it is proximate the third port 26. When the movable member 30 is in the third position fluid is able to flow simultaneously through both the first port 22 and the second port 24, through the cavity 18 and through the third port 26.

In the illustrated embodiment, clearance between the movable member 30 and walls 34 that define the cavity 30 are sized to assure the movable member 30 moves in response to fluid flowing through the cavity 18. A channel 38 is formed in the walls 34 and fluidically connects the cavity 18 to the third port 26. The channel 38 is sized and positioned such that fluid flowing through the cavity from both the first port 22 and the second port 24 can exit through the third port 26 while positioning the moveable member 30 substantially centrally about the third port 26. In one embodiment, the walls 34 are smooth and a transition from the walls 34 to the channel 38 are also smooth curved surfaces 46 blended and without edges formed at intersections of the walls 34 and the channel 38. Either or both the walls 34 of the cavity 18 and the curved surfaces 46 of the channel 38 may be seamless in that they are not formed by joining separate components to construct the housing 14, for example. The channel 38 is formed symmetrically about a centerline of the third port 26 and extends by a dimension 42 in opposing directions from the centerline.

Figure 3:
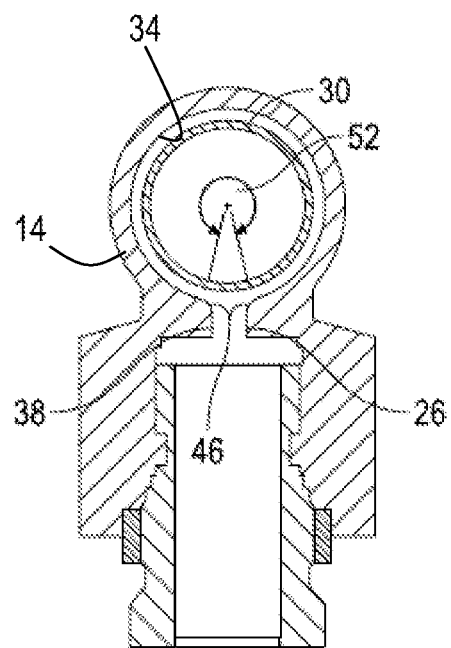
FIG. 3 depicts a partial cross sectional view of the dual check valve of FIG. 1 taken at arrows 3-3.

Referring to FIG. 3 the curved surfaces 46 illustrated in this embodiment are radiuses that smoothly blend the smooth walls 34 of the cavity 18 to the third port 26 over at least a portion of the dimension 42 in both directions from a center of the third port 26. The curved surfaces 46 may not be true radiuses but instead may be alternate curves that blend the walls 34 of the cavity 18 into the channel 38. The curved surfaces 46 help to locate the movable member 30 stably while flow from both the first port 22 and the second port 24 flows past the movable member 30 into the channel 38 and then into the third port 26. Forming the channel 38 and the curved surfaces 46 inside the housing 14 such that they smoothly blend the walls 34 of the cavity 18 to the third port 26 can be done by electrical discharge machining (EDM) where the electrode is inserted into one end 50 of the cavity 18, for example, to reach the location where the channel 38 and the curved surfaces 46 are to be formed.

As mentioned above there is little radial clearance between the movable member 30 and the cavity 18. For example, having a radial clearance in the range of about 0.007 to 0.008 inches for a member 30 with a spherical shape having a diameter of about 0.625 inches helps to prevent the movable member 30 from chattering against the walls 34. The presence of the channel 38 provides extra clearance between the movable member 30 and the walls 34 near the third port 26 that doesn't exist elsewhere between the cavity 18 and the movable member 30. To avoid excess clearance the channel 38 is maintained over a small perimetrical dimension thereby leaving a significant portion of the walls 34 perimetrically surrounding the movable member 30. The existence of the channel 38 means that the walls 34 of the cavity 18 in the area of the channel 38 cannot surround the movable member 30 throughout a full 360 degrees. To avoid excessive clearance around the movable member 30 in the area of the channel 38 an angle 52 that defines a perimetrical extent over which the cylindrical portion of the cavity 18 is maintained should be kept large. For example, maintaining the angle 52 at about 250 degrees or more or even 270 degrees or more perimetrically is desirable. This perimetrical support to the movable member 30 should prevent damage due to vibration between the movable member 30 and the walls 34 or the curved surfaces 46.

Figure 2:
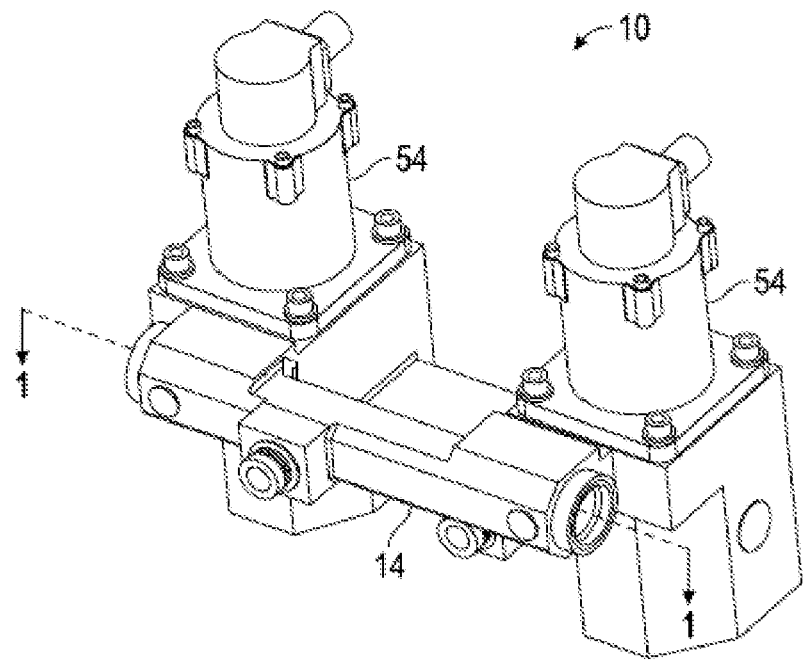
FIG. 2 depicts a perspective view of the dual check valve assembly of FIG. 1.

Referring to FIG. 2, the foregoing structure described in reference to the dual check valve 10 allows for operation under a wide range of conditions. For example, when employed with two pumps 54 while being launched into earth orbit aboard a rocket, the dual check valve 10 allows the two pumps 54 to simultaneously pump fluid at similar pressures (even if not at similar flows). Allowing the pumps 54 to rotate during launch can be beneficial to pump bearings that might otherwise be damaged by vibrational G loads experienced during launch if the pumps 54 were not rotating. Additionally, the small clearance between the movable member 30 and the walls 34 minimizes lateral movement of the movable member 30 within the cavity 18 that could result in damage to the movable member 30 or the walls 34 due to vibrations during a launch. Such damage to the movable member 30 could detrimentally affect the ability of the member 30 to seal against seats 58 positioned near the ports 22 and 24.

The effective density of the movable member 30 should be substantially the same as the density of the fluid passing through the valve 10. Doing so makes the movable member 30 neutrally buoyant in the fluid and eliminates forces on the movable member 30 within the cavity 18 due to G loads during a launch. This neutral buoyancy also allows the dual check valve 10 to function properly independently of the orientation of any G loads applied thereto. In one embodiment the movable member 30 is made hollow out of metal, ceramic, glass or a polymer, for example. By altering a volumetric portion of the movable member 30 that is hollow the effective density of the movable member 30 is adjusted. In another embodiment the hollow movable member 30 can be filed with a fluid of a selected density.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A dual check valve, comprising:
a housing having a cavity fluidically connecting three ports; and
a movable member movably engaged within the cavity from at least a first position occluding a first port of the three ports, a second position occluding a second port of the three ports, and a third position allowing flow between both the first port, the second port and a third port of the three ports,
wherein the cavity includes a channel located proximate the third port configured to allow flow past the movable member from both of the first port and the second port to the third port, and
wherein the movable member is spherical and the cavity is cylindrical, and the walls adjacent the channel perimetrically surround at least about 250 degrees of the movable member.

2. The dual check valve of claim 1, wherein the channel is smoothly blended to walls defining the cavity with curved surfaces.

3. The dual check valve of claim 2, wherein the walls defining the cavity and the curved surfaces are seamless.

4. The dual check valve of claim 1, wherein the walls adjacent the channel perimetrically surround at least about 270 degrees of the movable member.

5. The dual check valve of claim 1, wherein the first port is near one end of the cavity the second port is near another end of the cavity and the third port is between the first port and the second port.

6. The dual check valve of claim 1, wherein the first port and the second port are inlet ports and the third port is an outlet port.

7. The dual check valve of claim 1, wherein the movable member is hollow.

8. The dual check valve of claim 1, wherein the movable member is configured to be neutrally buoyant in fluid anticipated to flow through the dual check valve.

9. The dual check valve of claim 1, wherein the movable member becomes stably positioned proximate the third port when fluid is flowing through both the first port and the second port.

10. The dual check valve of claim 9, wherein fluid is flowable from the first port through a portion of the cavity through a portion of a channel and out the third port and fluid is flowable from the second port through a portion of the cavity through a portion of a channel and out the third port when the movable member is positioned stably proximate the third port.

11. A method of controlling flow through a dual check valve, comprising:
flowing fluid through a first port into a cavity in a housing;
flowing fluid through a second port into the cavity in the housing;
positioning a movable member within the cavity proximate a third port with the flowing fluid; and
flowing fluid from both the first port and the second port out the third port,
wherein the cavity includes a channel located proximate the third port configured to allow flow past the movable member from both of the first port and the second port to the third port, and
wherein the movable member is spherical and the cavity is cylindrical, and the walls adjacent the channel perimetrically surround at least about 250 degrees of the movable member.

* * * * *